United States Patent [19]
Smith

[11] 4,035,015
[45] July 12, 1977

[54] TRAILER

[76] Inventor: Marjorie Ann M. Smith, 3825 Valley Blvd. No. 56, Walnut, Calif. 91789

[21] Appl. No.: 634,611

[22] Filed: Nov. 24, 1975

[51] Int. Cl.² .................................. B62D 25/02
[52] U.S. Cl. .................. 296/28 R; 280/106 T; 296/43
[58] Field of Search .......... 296/28 R, 28 M, 28 D, 296/28 J, 29, 43, 104; 280/106 T

[56] References Cited

U.S. PATENT DOCUMENTS

| 70,006 | 10/1867 | Leslie et al. | 296/43 |
|---|---|---|---|
| 564,740 | 7/1896 | Dietz | 296/43 |
| 1,572,029 | 2/1926 | Nelson et al. | 296/43 |
| 2,324,508 | 7/1943 | Johnson | 296/104 |
| 2,565,746 | 8/1951 | Turner | 296/104 |
| 3,097,880 | 7/1963 | Reader | 296/43 |
| 3,374,029 | 3/1968 | Barker | 296/43 |

Primary Examiner—Joseph E. Peters, Jr.
Assistant Examiner—David M. Mitchell
Attorney, Agent, or Firm—Christie, Parker & Hale

[57] ABSTRACT

A trailer has an outer metal framework for supporting the trailer flatbed, and a series of upright sidewall sleeves mounted along each side of the flatbed frame. Each sidewall sleeve comprises a sheet piece rolled to form an elongated tubular section adjacent a generally planar flanged section extending laterally away from one side of the tubular section. The flanged sections of the sidewall sleeves are rigidly attached to the flatbed framework, and provide means for bolting the trailer side panels in place. The tubular sections of the sidewall sleeves provide structural strength for the side panels and also provide a means for holding support struts for a canopy top which covers the trailer flatbed.

2 Claims, 5 Drawing Figures

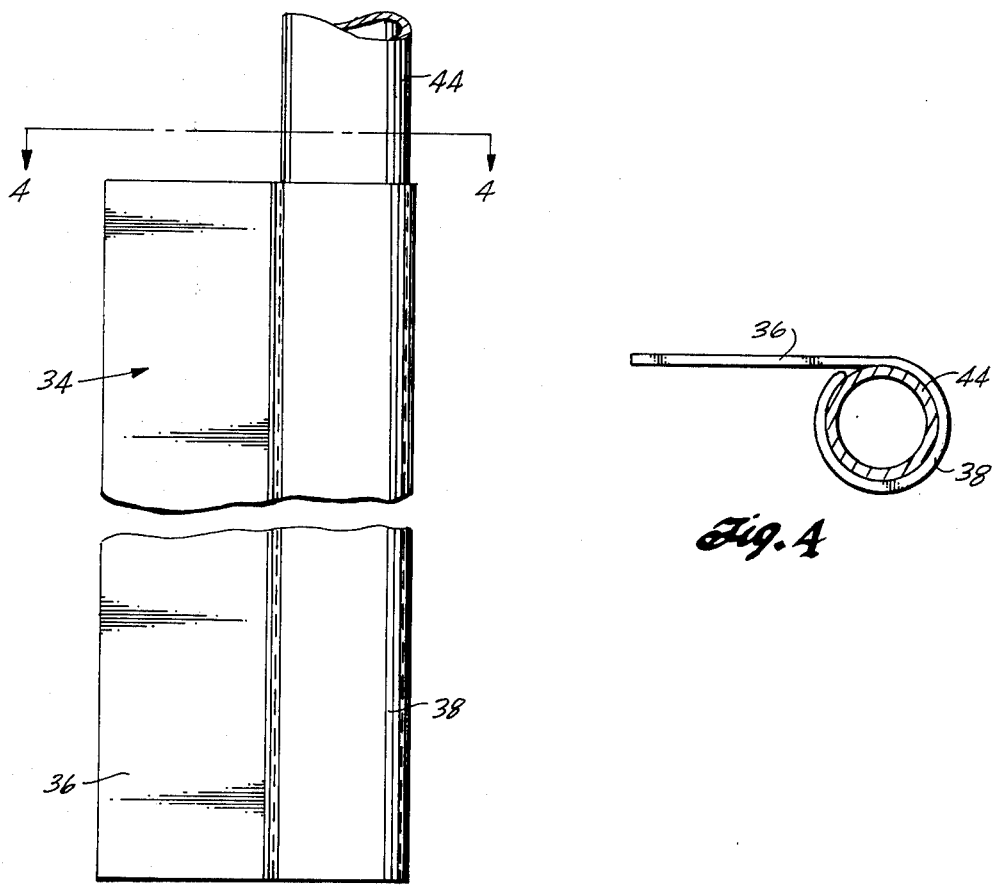
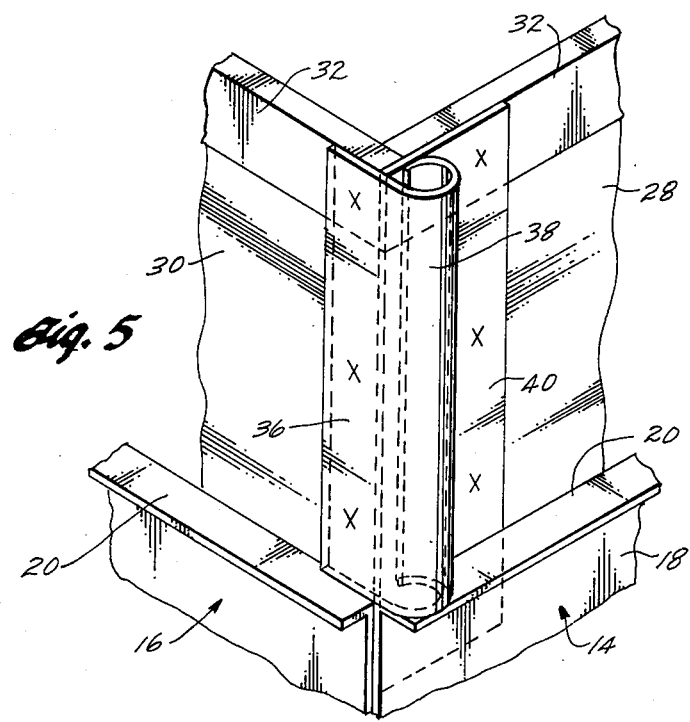

TRAILER

BACKGROUND

This invention relates to transport vehicles, such as trailers, and more particularly to a structurally improved framework for such vehicles.

Utility type trailers are commonly used for such jobs as transporting furniture, building materials, light weight farming equipment, camping gear, motorcycles, ponies, and the like. Prior art utility trailers generally are not designed well structurally. For example, trailer side panels often bow outwardly after a period of use because the trailer framework typically does not provide a good means of lateral support for the side panels. Those trailers intending to provide structural support for the side panels often use angle material which has limited ability to provide good lateral support. Prior art trailers, because of their poor design, also are heavier than they need to be, and have disadvantages in terms of reduced fuel economy, reliability, and driving stability, as well as increased material costs.

SUMMARY

This invention overcomes these problems by providing a transport vehicle having an improved framework construction.

Briefly, one embodiment of the invention comprises a trailer, or the like, having a sidewall structure in which a plurality of spaced apart sidewall sleeves are rigidly attached in an upright position along each side of the trailer flatbed. Each sidewall sleeve comprises a continuous sheet metal piece rolled to form an elongated tubular section which merges into a generally planar flanged section integral with and extending laterally away from one side of the tubular section. The flanged sections of the sidewall sleeves are rigidly attached to the chassis or flatbed supporting frame of the trailer. The flanged sections provide a means for rigidly attaching the sidewall panels of the trailer in place. The tubular sections of the sidewall sleeves add bending strength which resists lateral loads acting outwardly on the trailer sidewalls. This resulting structure provides a light weight trailer having relatively high strength. The tubular sections also provide a convenient means for receiving support members of a light weight canopy top for covering the flatbed of the trailer.

These and other aspects of the invention will be more fully understood by referring to the following detailed description and the accompanying drawings.

DRAWINGS

FIG. 3 is a fragmentary elevation view showing the sidewall sleeve;

FIG. 4 is a partly cross-sectional view taken on line 4—4 of FIG. 3; and

FIG. 5 is a fragmentary perspective view showing a sidewall sleeve corner structure according to this invention.

DETAILED DESCRIPTION

Figure 1:
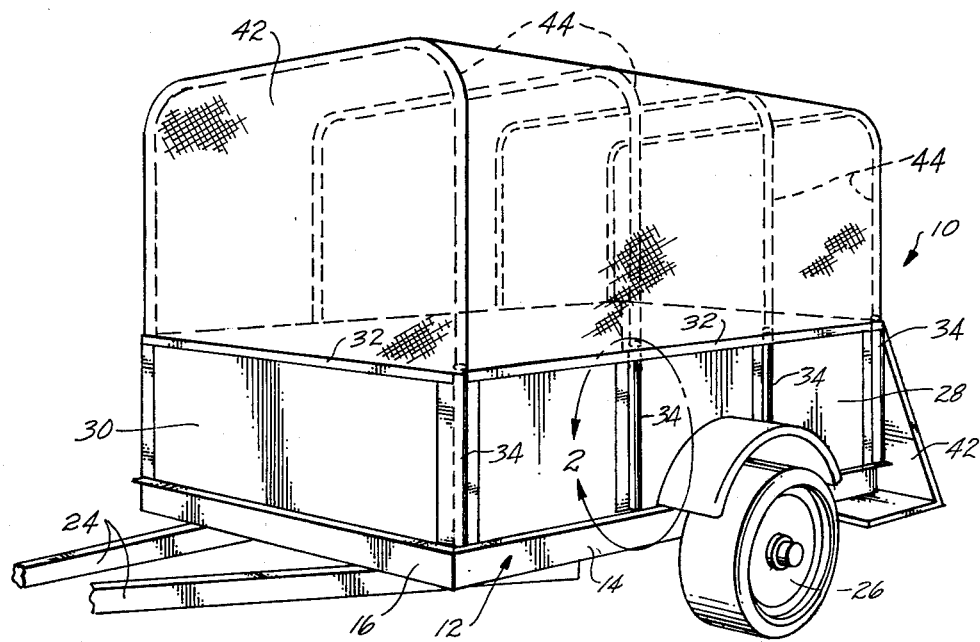
FIG. 1 is a fragmentary perspective view showing a utility trailer according to this invention.
Figure 2:
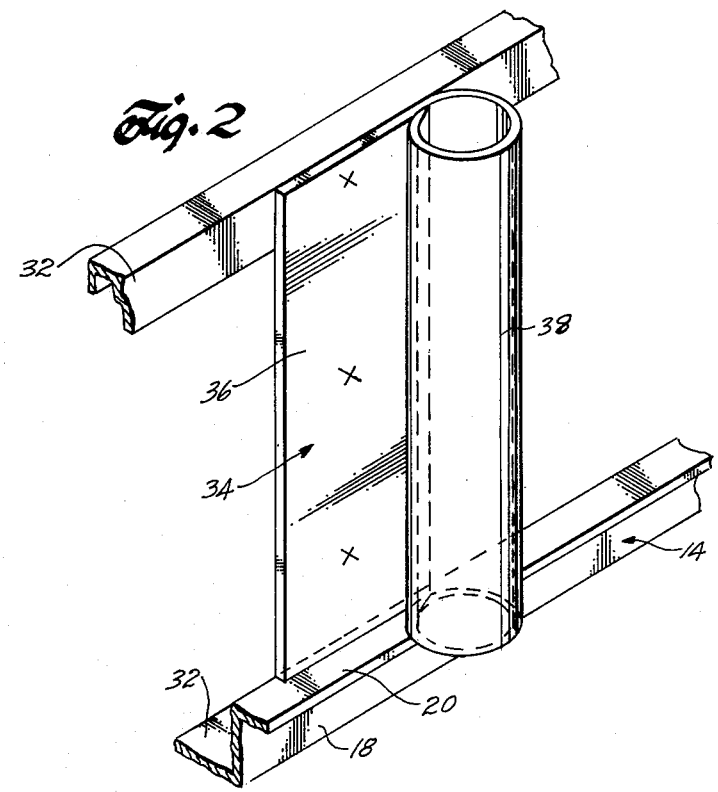
FIG. 2 is an enlarged fragmentary perspective view, partly in cross-section, showing a sidewall sleeve within the circle 2 of FIG. 1.

Referring to the drawings, a utility trailer 10 according to this invention includes a rectangular flatbed frame or chassis 12 having parallel, elongated metal frame members or bearing plates 14 extending along opposite sides of the flatbed frame, and a front bearing plate 16 at the front end of the flatbed frame. The ends of the front bearing plate 16 are welded to the front end of the side bearing plates 14. The side bearing plates 14 and 16 are generally Z-shaped in cross-section, as shown in FIG. 2. The bearing plate cross-section includes a vertical central web 18, an outwardly extending horizontal lip or flange 20 extending along the top of the web, and a longer inwardly projecting lip or flange 22 at the bottom of the web for supporting the edges of the trailer flatbed (not shown). The rear of the flatbed frame 12 includes a generally C-shaped metal channel (not shown) welded between the rear ends of the side bearing plates 14.

The trailer is towed by a tongue having tubular drawbars 24 rigidly attached to the substructure of the trailer flatbed frame. The frame substructure includes rigid cross-bracing (not shown) and a means for supporting an axle for the wheels 26 of the trailer.

The trailer has a sidewall structure, according to this invention, for rigidly supporting upright sidewall panels 28 on opposite sides of the flatbed, and an upright front panel 30 at the front end of the flatbed. The side and front panels 28, 30 preferably are made of wood. The side and front panels also have metal sidewall caps 32 preferably of generally U-shaped cross-sectional configuration. The sidewall caps fit snugly over the top edges of the side and front wall panels and preferably are for the purpose of keeping the plywood panels from separating and to prevent them from warping.

The side and front wall panels 28, 30 are rigidly supported by a number of sidewall sleeves 34 according to this invention. Each sidewall sleeve is made from a preferably rectangular piece of sheet metal, preferably 16-gauge cold-rolled steel. The sleeve configuration includes a planar flanged section 36 which is rolled back on itself at one end to form an open-ended tubular section 38 extending along one side of the flanged sections. Preferably, the width of the flanged section is about equal to the diameter of the adjacent tubular section. The sheet metal piece is rolled so that the tubular section projects entirely away from the plane of the flanged section and also so that the internal diameter of the tubular section is essentially uniform from end-to-end.

Each sidewall sleeve 34 has a length sufficient to extend from the top edge of the bearing plates 14, 16 to the vicinity of the top edge of the sidewall caps 32.

In the preferred method of fabricating the sidewall sleeves, a generally rectangular flat sheet metal piece is placed in a device known in the sheet metal art as a brake. A round metal bar, preferably 1⅛ inch in diameter, is then placed on the portion of the metal piece to be formed into the tubular section 38. The brake is then operated to bend a portion of the metal piece around the bar. This step is then repeated for several consecutive bends around the bar until the tubular portion of the sleeve is completed.

Preferably, the trailer sidewall structure includes a plurality of upright sidewall sleeves 34 rigidly attached in a spaced apart relation along each side of the trailer frame 12. The number of sleeves will depend upon the length of the trailer. In the trailer shown in the drawings, a pair of spaced apart sidewall sleeves are mounted at intermediate points along each side of the trailer, and one sleeve is moutned at each corner.

The sleeves at the intermediate portions of the sidewall preferably are mounted by butt welding the bottom of the flanged section 36 to the short horizontal flange 20 of the side bearing plate 14.

The front corner sidewall sleeve is mounted in the configuration shown in FIG. 5. An extension plate 40 is initially welded to the inside edge of the tubular portion 38 to rigidly hold the extension plate 40 at a right-angle relative to the plane of the flanged section 36. The extension plate 40 has a longer vertical dimension than the sidewall sleeve 34 so that a portion of the extension plate hangs down below the bottom edge of the sidewall sleeve. The bottom edge of the flanged section 36 is butt welded to the short horizontal flange 20 of the front bearing plate 14. The portion of the extension plate 40 which overlaps the upright flange 18 of the bearing plate 14 is welded to the bearing plate.

The sidewall sleeve at the rear corner of the trailer is butt welded at the bottom of flanged section 36 to the top flange 20 of the bearing plate 14. The tubular portion 38 of the rear sidewall sleeve is welded to an adjacent metal tall corner structure 42 which extends across the rear of the trailer and is rigidly attached to the trailer framework.

The sidewall panels 28 are bolted to the flanged sections 36 of the intermediate and rear sidewall sleeves. The front end portion of the sidewall panels are bolted to the extension plate 40. The end portions of the front panel 30 are bolted to the flanged portions 36 of the front sidewall sleeves. Preferably, the bolting is done at the locations marked with an X in FIGS. 2 and 5. The panels preferably are bolted by drilling 3/16 inch holes through the plywood sidwalls and the top caps 32, and then installing self-drilling screws (not shown), such as those known in the art as "Tek screws". The screws preferably are installed from the inside of the trailer, and the sharp ends of the screws which project through the flanged portions of the sidewall sleeves are capped off with rubber bumpers (not shown).

The tubular sections 38 of the sidewall sleeves 34 provide a means for mounting a top structure including a relatively light weight canopy 42 for covering the trailer flatbed. The canopy preferably is made from a downwardly opening, generally U-shaped piece of flexible sheeting, such as nylon-reinforced vinyl. The canopy is supported by a series of spaced apart, downwardly opening, generally U-shaped suport members 44, the end portions of which project below the canopy and provide rigid struts for fitting into corresponding tubular portions 38 of the sidewall sleeves.

Thus, a rigid sidewall structure is formed by attaching the trailer sidewalls to the rigidly mounted metal flanged portions of the sidewall sleeves. Moreover, the tubular-shaped portions of the sidewall sleeves have a large moment of inertia which adds to the bending strength of the sidewall structure and improves its ability to resist lateral forces acting outwardly on the sidewalls which tend to bend any support structures for the trailer side panels. In addition, the tubular-shaped portions of the sidewall sleeves provide a convenient means for mounting the support members of the light weight canopy top 42.

I claim:

1. A transport vehicle comprising:

a flatbed structure which includes a pair of spaced apart, elongated metal frame members extending along opposite outer edges of the flatbed structure;

a separate series of spaced apart side wall sleeves extending along each frame member;

each side wall sleeve comprising a single sheet metal piece of substantially uniform thickness having top and bottom edges and having side-by-side first and second regions extending between the top and bottom edges of the sheet metal piece, said first region forming the wall of an elongated rounded tube, said second region forming a generally planar flange integral with the wall of the tube and merging into the tube at the juncture between said first and second regions, the flange extending away from only one side of the tube, the tube projecting away from only one side of the plane defined by the flange, the flange being a single continuous piece extending from the top to the bottom of the tube;

means integrally bonding a bottom portion of each side wall sleeve to a corresponding metal frame member to position the side wall sleeves in upright positions extending above the frame members, with the tube of each side wall sleeve facing outwardly away from the flatbed structure;

a separate side panel extending along each frame member and abutting against the flanges of the upright side wall sleeves on the sides thereof remote from the outwardly facing tubes;

means securing the side panels to the flanges abutted by the side panels, the side wall sleeves providing means for resisting outward forces applied along the length of the side panels; and a top structure for covering the flatbed including separate series of longitudinally spaced apart upright support members, each support member being releasably disposed in a corresponding one of the tubes in the upright side wall sleeves.

2. A transport vehicle according to claim 1 in which each metal frame member is of generally Z-shaped cross-sectional configuration and defines a top flange projecting outwardly from the flatbed structure, an upright web below the top flange, and a bottom flange extending inwardly toward the flatbed structure, the bottom of each side wall sleeve flange being integrally bonded to the top flange of the frame member.

* * * * *

UNITED STATES PATENT AND TRADEMARK OFFICE
CERTIFICATE OF CORRECTION

PATENT NO. : 4,035,015
DATED : July 12, 1977
INVENTOR(S) : Marjorie Ann M. Smith It is certified that error appears in the above-identified patent and that said Letters Patent are hereby corrected as shown below:

Abstract, line 4, after "sheet" insert -- metal --.
Col. 1, line 37, "rigidily" should be -- rigidly --.
Col. 2, line 41, "sections." should be -- section. --;
      line 68, "moutned" should be -- mounted --.
Col. 3, line 22, "tall" should be -- tail --;
      line 33, "sidwalls" should be --sidewalls --;
      line 47, "suport" should be -- support --.

Signed and Sealed this

Seventh Day of March 1978

[SEAL]

Attest:

RUTH C. MASON
Attesting Officer

LUTRELLE F. PARKER
Acting Commissioner of Patents and Trademarks